Dec. 1, 1959 H. NEUMANN-LEZIUS 2,915,244
CLUTCH DEVICES FOR CONTROLLING CALCULATING MACHINE FUNCTIONS
Filed Jan. 19, 1955 4 Sheets-Sheet 4

Inventor:
HANS NEUMANN-LEZIUS
BY
AGENT

United States Patent Office 2,915,244
Patented Dec. 1, 1959

2,915,244

CLUTCH DEVICES FOR CONTROLLING CALCULATING MACHINE FUNCTIONS

Hans Neumann-Lezius, Braunschweig, Germany, assignor to Brunsviga Maschinenwerke Aktiengesellschaft, Braunschweig, Germany Application January 19, 1955, Serial No. 482,841

Claims priority, application Germany January 22, 1954

8 Claims. (Cl. 235—62)

The present invention relates to calculating machines and particularly to individual clutch devices for controlling machine functions, such as addition, subtraction, denominational shift, zeroizing, etc.

It is an object of the present invention to provide a clutch of the kind described which is simple and safe in operation.

It is a further object of the present invention to provide a reversible clutch.

It is another object of the present invention to provide identical clutches for the control of different machine functions.

Further objects and advantages will become apparent from the following description of the invention taken in conjunction with the figures, in which.

Figure 2:
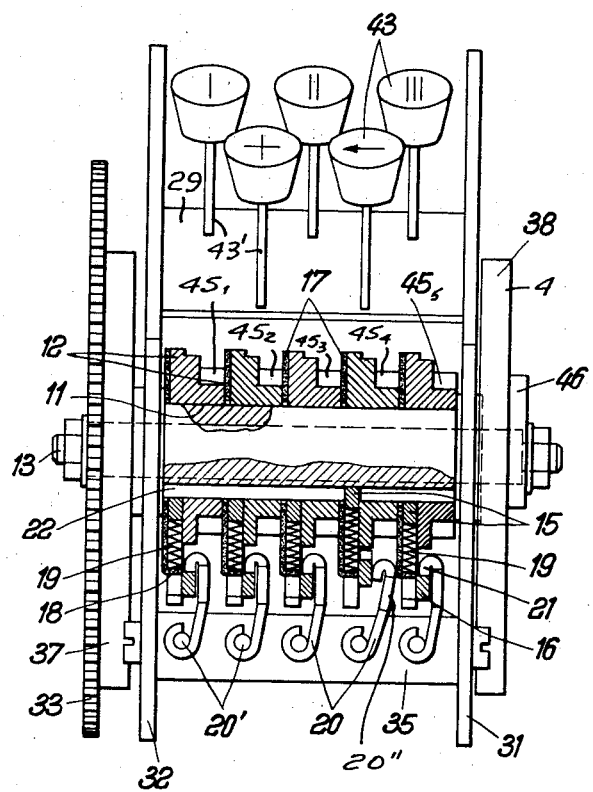
Fig. 2 is a front elevation, partly in section of the clutch assembly shown in Fig. 1.
Figure 4:
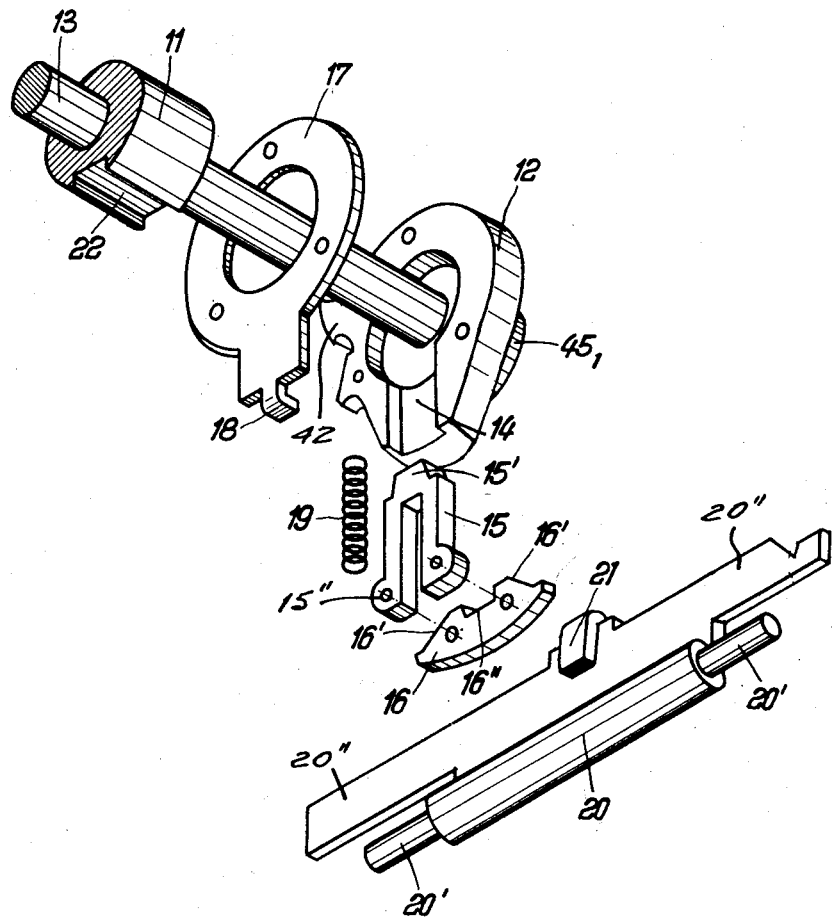
Fig. 4 is an exploded perspective view of the elements of the clutch shown in Figs. 1–3.

Referring now to the drawings, a driving shaft 13 is supported for rotation in walls 31, 32 which are connected, for instance by flat cross pieces 34, 35. The shaft 13 is rotated by a gear wheel 33 driven by the main drive (not shown) of the machine. A sleeve 11 provided with an axially extending peripheral groove 22 is rigidly connected with the shaft 13 between the walls 31, 32. The sleeve 11 rotatably supports a plurality of, for instance five driven elements of the clutch or coupling disks 12 rigidly connected, respectively, to gear wheels $45_1$, $45_2$, ... $45_5$. As shown in Fig. 4, each coupling disk or driven element 12 of the clutch is provided with a radial groove or recess 14 in which a locking member, or clutch coupling element 15, is radially shiftable. A projection 15' on the locking member 15 is engageable with the axial groove 22 of the sleeve 11 extending from one side wall 31 to the other side wall 32 (Fig. 2). The locking member or clutch coupling element 15 is urged radially toward the driving sleeve 11 by a helical spring 19 arranged in the space formed by the two arms of the locking member or clutch coupling element 15, the bottom of recess 14 and a radially extending projection on a lid 17. The spring 19 abuts with one end against a projection 18 forming part of the lid 17 secured by screws (not shown) to the coupling disk or driven element 12. The other end of the spring 19 rests on the upper end of the U-shaped locking member 15. The outer ends 15" of locking member or clutch coupling element 15 are attached to the inclined side portions 16' of a member 16 provided with a centrally arranged recess 16". A curved projection 21 of a longitudinally pivoted element or bar 20" secured to a sleeve 20 is connected to an axial shaft 20' rotatably arranged in the flat cross pieces 34, 35. Springs 36 are arranged on the shafts 20' between the end faces of sleeve 20 and the pieces 34, 35 supporting the same; the springs 36 urge the sleeves 20 axially into their mid positions, and act as torsion springs urging, respectively, the curved projections 21 into the plane of the recesses 16" of the member 16.

Figure 1:
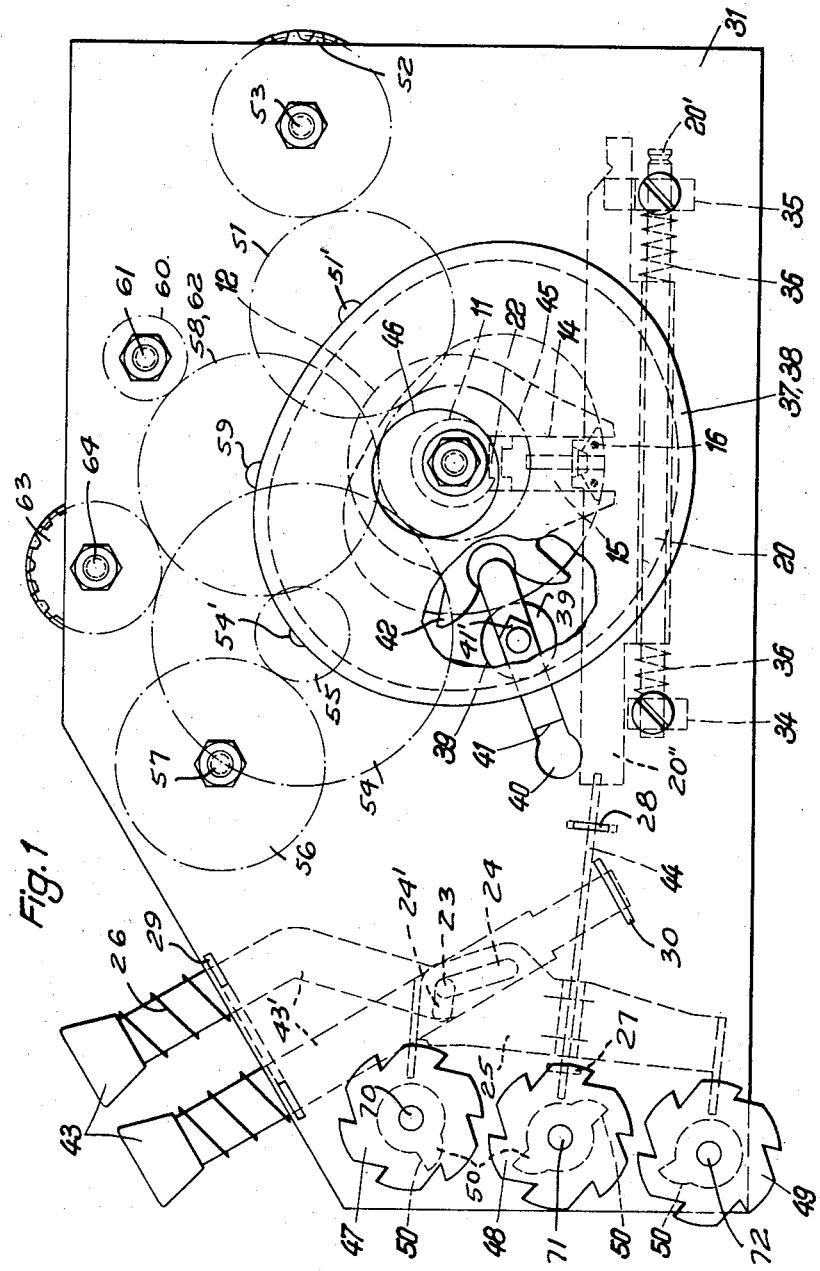
Fig. 1 is a side elevation of a clutch, the mechanism for engaging and releasing the clutch, and the immediate elements controlled by the clutch according to the present invention, some parts being broken away for the sake of clearness.
Figure 3:
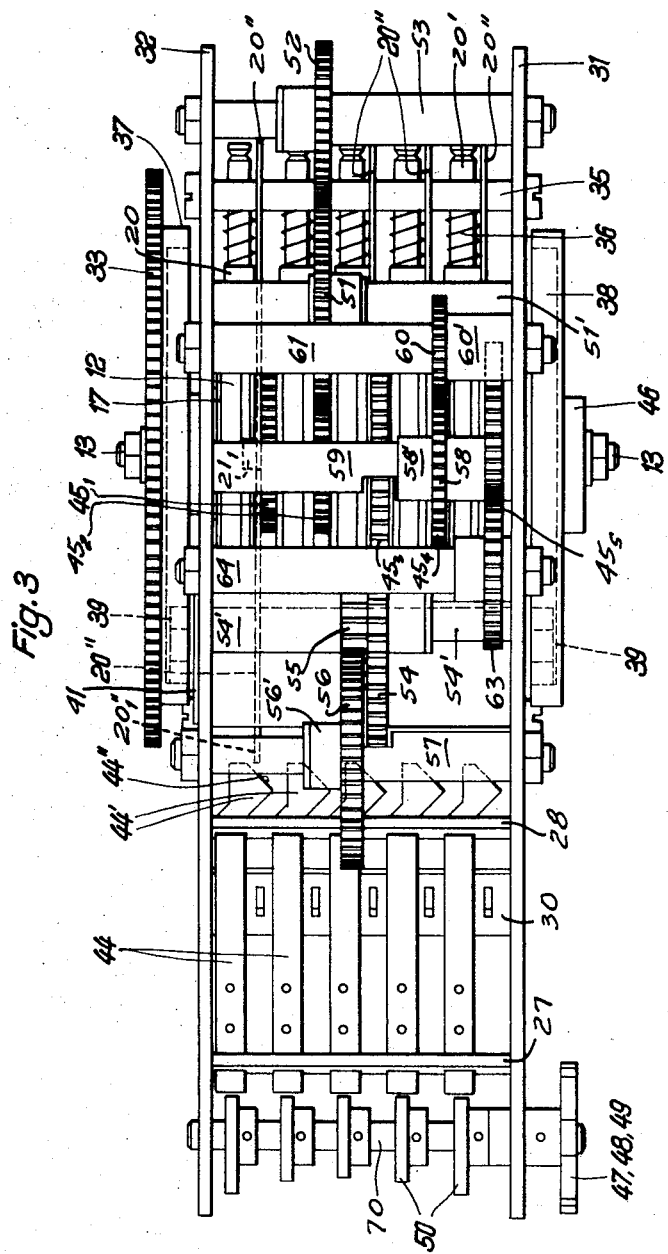
Fig. 3 is a top elevation of the clutch assembly shown in Figs. 1 and 2.

The function control keys 43 serve for releasing the couplings to engage the clutches. The keys 43 are displaceably guided with their stems 43' in cross members 29, 30 and kept in raised position by springs 26 arranged on the stems 43' between the keys 43 and the cross member 29. Pins 23 attached to the stem 43' engage slots 24 in angular members 25 rigidly connected with pushing members 44 guided for horizontal displacement by cross members 27, 28. The slots 24 are so arranged that at the depression of any key 43 the associated pushing member 44 is displaced toward the right as seen in Figs. 1 and 3. Thereby the inclined portion 44" of the head 44' on the pushing member 44 (Fig. 3) engages the bar 20" of the sleeve 20 associated therewith so as to rotate the same. The first coupling shown in Fig. 3 shows at $20_1$", the rest position of the bar 20" and of the inclined portion 44" of the head 44' of the member 44.

The operation of the clutch device is as follows:

When by depression of a function control key 43 and the displacement of the pushing member 44 associated therewith one of the five sleeves 20 is rotated, the locking member 15 associated therewith is released so that under the action of the associated spring 19 it is shifted in the radial guide 14 and enters the groove 22 of the sleeve 11. Thus, a coupling is established between the coupling disk or driven element 12 of the clutch and the driving shaft 13 and the sleeve 11 secured to the same. The bar 20" remains in the displaced position thereof, shown in Fig. 2 as associated with the toothed wheel $45_4$. For a full revolution of the shaft 13, the projection 21 cannot reenter the recess 16". The drive of the corresponding machine function is connected to the respective gear wheel $45_1$, $45_2$, ... rigid with one of the driven clutch elements 12.

For instance, the drawing shows five clutches of the kind described hereinabove which are arranged one adjacent to the other on a common driving shaft 13. The five clutches shown in Fig. 2 control, respectively, as seen from left to right in this figure:

(1) The reversible drive of the setting mechanism more fully disclosed in my U.S. Patent No. 2,815,912, dated December 10, 1957 and entitled "Setting Mechanism for Key-Set Calculating and Printing Machine." This clutch replaces the clutch schematically indicated by the pawl 71 engageable with the groove on the shaft 68 of the patent, thus initiating a full-cycle revolution of the setting shaft 68.

Thus the gear $45_1$ of the first coupling shown to the utmost left in Fig. 2 corresponds to the toothed wheel 67 engaging the gear 66.

(2) The drive for the actuator shaft 45 in the above-identified patent which effects the transfer of a digit set-up in the setting mechanism including the discs 15 to the accumulator digit wheels 49.

Referring now to the present disclosure, the rotating movement of the gear $45_2$ of the second clutch from the left is transferred by an intermediate gear 51 (Figs. 1 and 3) supported by an axle 51' in the walls 31, 32 to a gear 52 carried loosely on a bolt 53 screwed to the walls 31, 32 and engaging a driving wheel (not shown) rigid with the main shaft (not shown) of the machine, corresponding to the actuator shaft 45 in the patent.

(3) The zeroizing device for the revolutions counter mechanism including the digit wheel 43; no such zeroizing device is shown in the drawings of the patent, it being assumed that this device is of a type well known in the art.

In the present invention, the gear $45_3$ of the third coupling is engaged by a gear 54 on an axle 54' supported by the walls 31, 32 and rigidly connected with a coaxial gear 55. The gear 55 has a relatively small diameter and transfers the rotatory movement to a gear wheel 56 supported by the hub 56' thereof on a bolt 57 screwed to walls 31, 32. The gear wheel 56 meshes with the driving wheel (not shown) of the zeroizing device (not shown) of the revolutions counting mechanism (not shown) of the calculating machine.

(4) The carriage stepping mechanism; no such mechanism is shown in the drawings of the patent, it being assumed that this device is of a type well known in the art.

The gear wheel $45_4$ in Fig. 1 of this invention engages an intermediate wheel 58 supported with the hub 58' thereof by an axle 59 rigidly connected to the walls 31, 32. The intermediate wheel 58 engages a gear wheel 60 having a relatively small diameter and supported with the hub 60' thereof by a bolt 61 supported by the walls 31, 32. The toothed wheel 60 operates the carriage stepping mechanism (not shown) of the machine.

(5) The zeroizing device for the accumulator, i.e., for the digit wheels 49; although no zeroizing device for the accumulator is shown in the patent drawing, the zeroizing of the accumulator digit wheels 49 is mentioned in connection with the clutch KZ provided for the optional retransfer of an item from the accumulator digit wheels 49 to the setting mechanism at the zeroizing of the accumulator digit wheels 49.

The zeroizing mechanism (not shown in the attached drawings) of the accumulator (not shown) is driven by the toothed wheel $45_5$ of the fifth coupling through an intermediate wheel 62 of the same size as the intermediate wheel 58 and supported by the axle 59, and an intermediate wheel 63 supported by a bolt 64 supported by the walls 31, 32. The intermediate wheel 63 of the zeroizing mechanism projects a little beyond the contour of the plate walls 31, 32 as does the gear wheel 52.

After relieving the pressure on one of the keys 43 the bar 20" actuated by the same returns to its initial position. Shortly before the end of a full revolution of the shaft 13 one of the inclined side portions 16' of the member 16 engages the curved projection 21 thereby disengaging the locking member 15 from the groove 22 of the sleeve 11 and opening the clutch. Subsequently, when the shaft 13 has performed a full revolution the projection 21 reengages the centrally arranged recess 16" of the curved member 16 and thus locks the locking member 15 and the coupling disk or driven member 12 of the clutch in the disengaged position.

While one of the inclined side portions 16' rides up on the curved projection 21 the locking member 15 covers a radial path. First the projection 15' is lifted out of the longitudinal groove 22 of the sleeve 11 so that the clutch is opened before the locking member 15 reaches its furthest radial displacement. For this reason, care should be taken that the coupling disk or driven member 14 of the clutch and the gear wheel, such as $45_1$ integral therewith, do perform the remaining angular motion to assure that the recess 16" reaches the position in which it engages the curved projection 21. In order to accomplish this, cams 37, 38 are connected to the shaft 13 outside the walls 31, 32, which cams 37, 38 impart a reciprocating movement to a slide 41 movable in slots 40 (Fig. 1) of the side walls 31, 32 by means of rollers 39 at each revolution of the shaft 13. The knife edges 41' of the slide 41 engage the coupling disk 12, which is no longer positively driven at the end of each revolution, by means of the curved projection 42 shown in Fig. 1, thus returning the coupling disk or driven element 14 of the clutch exactly to its full-cycle rest position. The slide 41 is controlled so that it does not interfere with the free rotation of the coupling disk 12 after a swinging movement of the bars 20" and the sleeves 20 connected thereto.

If desired, the sequence of the movements of the bars 20" may be automatically controlled. In order to accomplish this a disk 46 is eccentrically secured to the shaft 13 which selectively advances through ratchets (not shown) the ratchet wheels 47, 48, 49, thereby angularly displacing the master shafts 70, 71, 72. Cam disks such as 50 are keyed, respectively to the shafts 70–72. Each cam disk 50, when in a predetermined angular position, displaces the associated pushing members 44 to pivot the bar 20" associated therewith. To make this possible, the slots 24 are extended at the upper end thereof at 24' in opposition to the direction of movement of the angular member 24 and the pushing member 44 so that the pins 23 may enter the extensions 24' of the slots 24 and thus to afford the necessary freedom of movement. The cam disks 50 may be angularly adjusted with respect to the shafts 70–72 so as to enable any program to take its course.

Instead of arranging the ratchet wheels 47–49 one above the other with the axes or shafts 70–72 parallel, as shown in Figs. 1 and 2, they may be arranged in any desired number one along side the other on a common axis (not shown).

It is intended that all matter contained in the above description or shown in the accompanying drawings shall be interpreted as illustrative and not in a limiting sense.

What I claim and desire to protect by Letters Patent is:

1. In a calculating machine, in combination, a driving shaft; a sleeve rigid with said driving shaft and having an axially extending peripheral groove; a driven clutch element arranged for rotation on said sleeve, said driven element having a substantially radially directed recess; a clutch coupling element displaceably guided in said recess, said coupling element having two opposite end positions and being resiliently urged towards its first end position, said coupling element entering said groove of said sleeve when in its first end position and coupling said driven element to said sleeve for common rotation, said coupling element disengaging from said groove of said sleeve when in its second end position and releasing said driven element from common rotation with said sleeve; a member rigid with said coupling element, said member having inwardly directed sloping side portions and a centrally located recess therebetween; a pivoted element having a curved projection and adapted to assume an operative clutch disengaging position and an inoperative clutch engaging position; said curved projection being in the path of said sloping sides and said centrally located recess of said member as said member rotates with said driven element when said pivoted element is in its operative position, said curved projection being adapted to engage either of said sloping sides of said member, depending on the direction of rotation of said driven element, exerting an outwardly directed radial force on said member and thereby on said coupling element against the force resiliently urging said coupling element towards its first end position, whereby said driven element is decoupled from said sleeve; said curved projection, when embraced by said centrally located recess of said member, locking said member, said coupling element and said driven element in a predetermined angular full cycle position; said curved projection upon withdrawal from the path of said sloping sides and said centrally located recess of said member, releasing said member, whereby said coupling element will be resiliently urged towards its first end position, coupling said driving shaft to said driven element for common rotation, when said pivoted element is in its inoperative position; and resilient means urging said pivoted element towards its operative position.

2. A calculating machine as claimed in claim 1, in which said pivoted element is shaped as a bar carrying said curved projection, further comprising a sleeve rigid with said bar, a shaft concentrically arranged with said sleeve and transversely with respect to said driving shaft, and in which said coupling element has two lateral arms limiting a recess, resilient means positioned in said recess, said resilient means exerting said force urging said coupling element towards its first end position, said centrally arranged recess of said member being arranged in radial alignment with said recess of said coupling element.

3. In a calculating machine as claimed in claim 2, said resilient means for urging said pivoted element towards its operative position abutting against the end faces of said sleeve rigidly connected with said bar, said resilient means taking up any lateral force exerted on said end faces of said sleeve.

4. In a calculating machine as claimed in claim 3, said last-mentioned resilient means being torsion springs.

5. In a calculating machine as claimed in claim 2 and having a function control key, a push rod connected to said key and displaceable thereby, said push rod, when displaced, engaging said bar of said pivoted element to pivot said element into its inoperative position.

6. In a calculating machine as claimed in claim 2, and which includes a rotatable master shaft, a cam on the master shaft and rotating therewith, a push rod adapted to be displaced by said cam when it rotates through a predetermined angular position, said push rod, when displaced, engaging said bar of said pivoted element to pivot said element into its inoperative position.

7. A calculating machine as claimed in claim 1, further comprising a slide, said slide being connected to said driving shaft to perform a prescribed radial reciprocation with each revolution of said driving shaft, a radially directed substantially V-shaped cam notch on said driven element, said slide being positioned to engage said cam notch on said driven element when said driven element approaches said predetermined angular position from either side, said slide when engaged with said cam notch positively moving said driven element towards said predetermined angular position.

8. In a calculating machine as claimed in claim 7, a cam disc arranged eccentrically on said driving shaft, said slide being guided in stationary radially directed slots and being connected to said cam disc for reciprocation thereby, said cam notch having curved outwardly flaring opposed walls, and said slide having a knife edge engageable between said opposed walls as said clutch approaches full cycle position.

References Cited in the file of this patent
UNITED STATES PATENTS 2,399,890  Pott _____ May 7, 1946

FOREIGN PATENTS 860,421  Germany _____ Dec. 22, 1952